United States Patent [19]
Bourne

[11] Patent Number: 5,704,132
[45] Date of Patent: Jan. 6, 1998

[54] INDICATOR HOLDER WITH SLIDABLE CONNECTING MEMBER

[76] Inventor: E. T. Bourne, 390 S. Lemon Ave., Walnut, Calif. 91789

[21] Appl. No.: 585,716

[22] Filed: Jan. 16, 1996

[51] Int. Cl.$^6$ ..................................... G01B 3/22
[52] U.S. Cl. .................... 33/628; 33/626; 248/904
[58] Field of Search ............... 33/626–643; 116/230; 248/904

[56] References Cited

U.S. PATENT DOCUMENTS

| | | | |
|---|---|---|---|
| 3,380,321 | 4/1968 | Schaffler | 33/628 X |
| 3,442,478 | 5/1969 | Paropetti | 33/833 X |
| 3,542,323 | 11/1970 | Arnold | 248/404 X |
| 3,826,011 | 7/1974 | D'Aniello | 33/642 X |
| 4,050,661 | 9/1977 | Wooldridge | 248/285.1 |
| 4,348,097 | 9/1982 | Sippel | 346/428 |
| 4,437,803 | 3/1984 | Volna | 33/642 X |
| 4,554,743 | 11/1985 | Grohom et al. | 33/655 X |
| 4,623,286 | 11/1986 | Hitt | 33/628 X |
| 5,036,595 | 8/1991 | Nevery | 248/904 X |
| 5,259,120 | 11/1993 | Chopman et al. | 33/502 |

Primary Examiner—Thomas P. Noland
Attorney, Agent, or Firm—J. E. Brunton

[57] ABSTRACT

An indicator holder for use in connection with a dial test indicator and with machine tools such as jigbore machines, milling machines and the like which is of simple construction, but yet is extremely versatile in use and enables positioning of the dial test indicator in a multitude of orientations relative to the workpiece being measured. More particularly, because of the novel design of the device, forward, backward and transverse movement of the dial test indicator relative to the workpiece can be readily achieved.

16 Claims, 3 Drawing Sheets

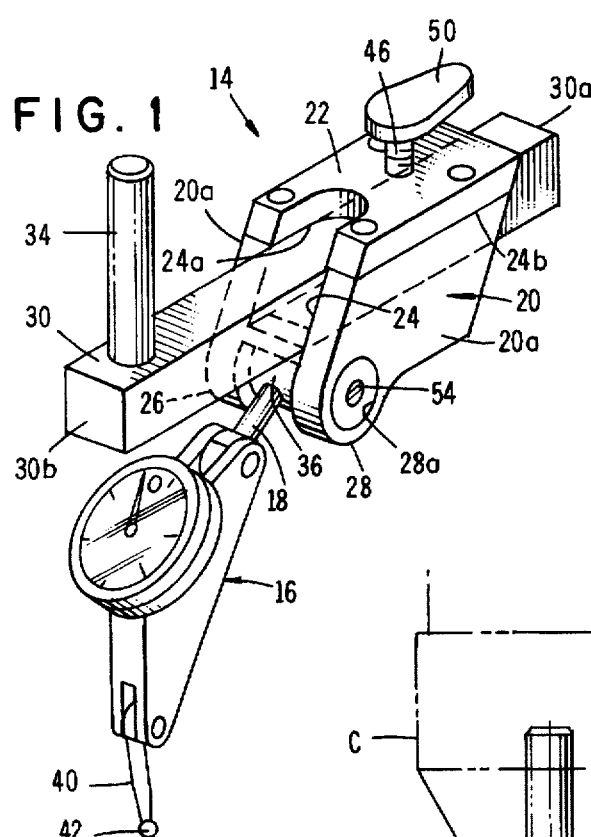
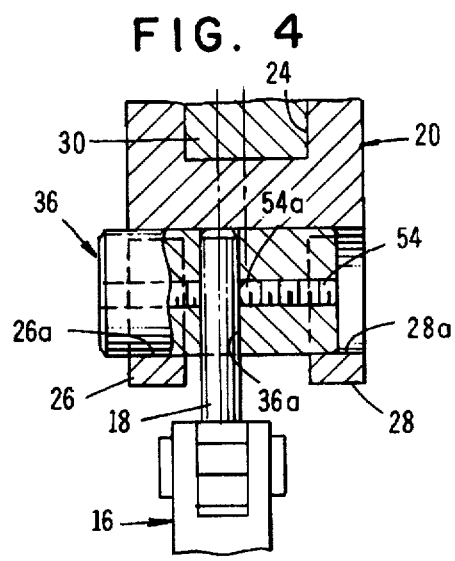
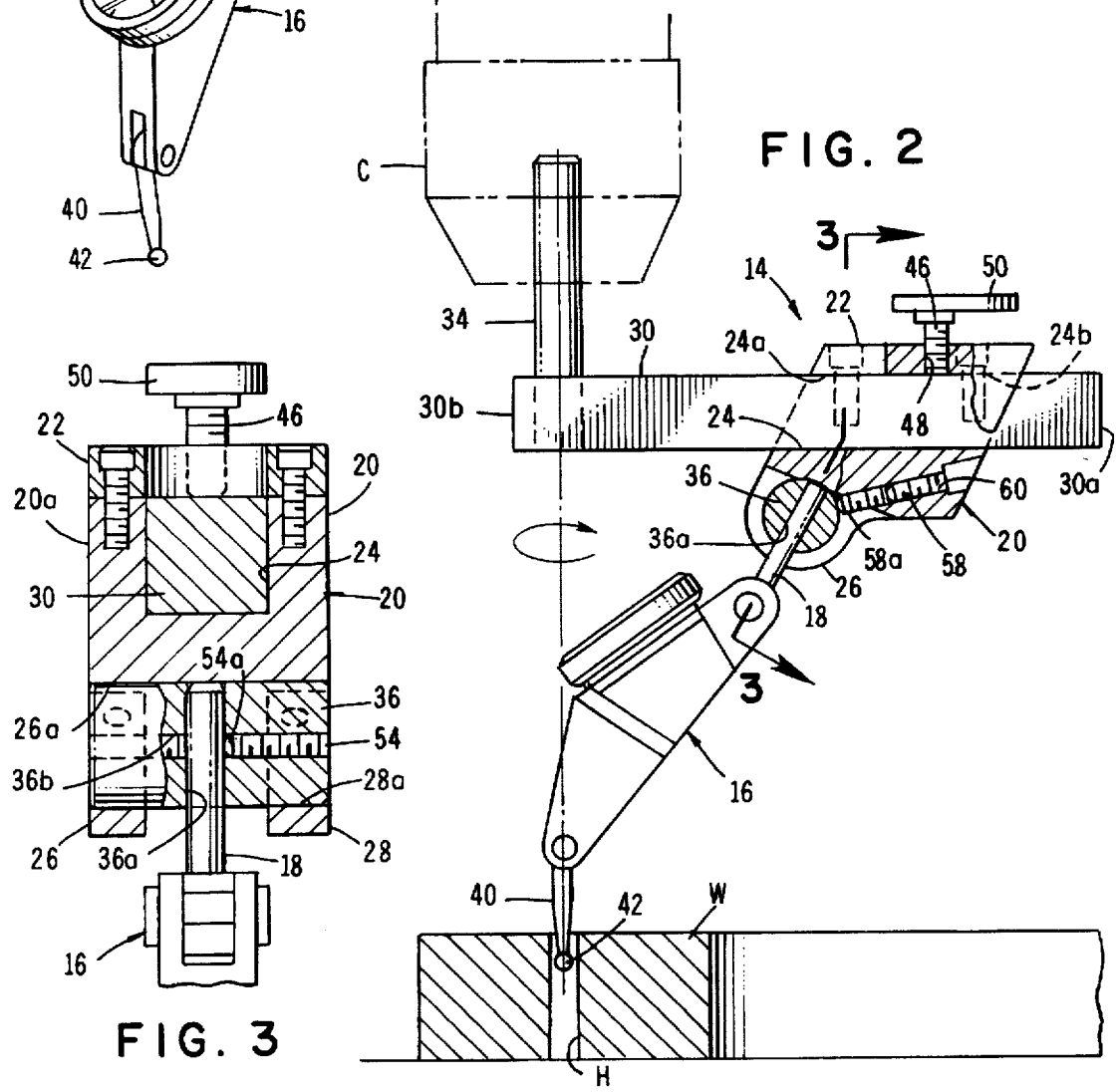

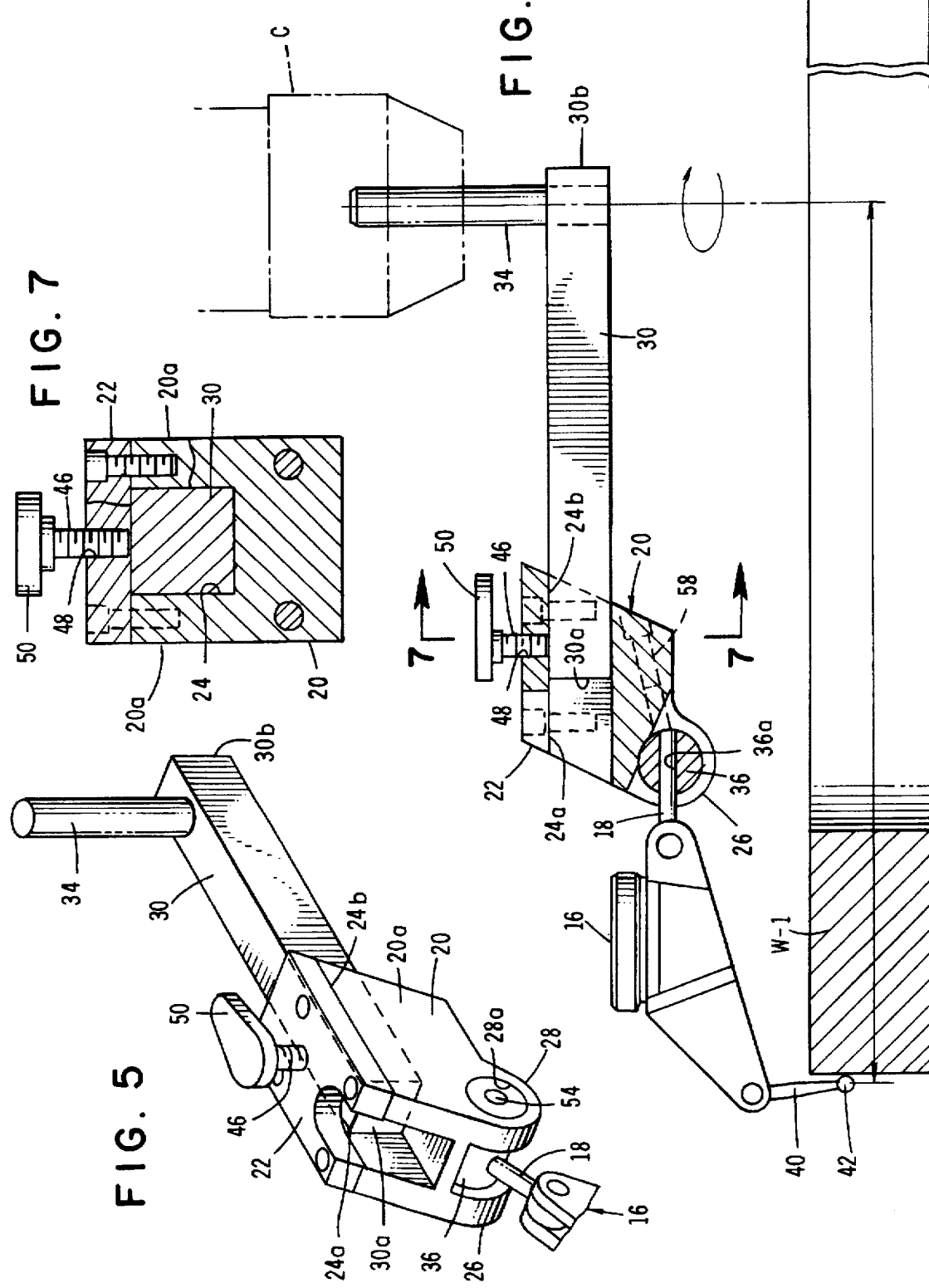

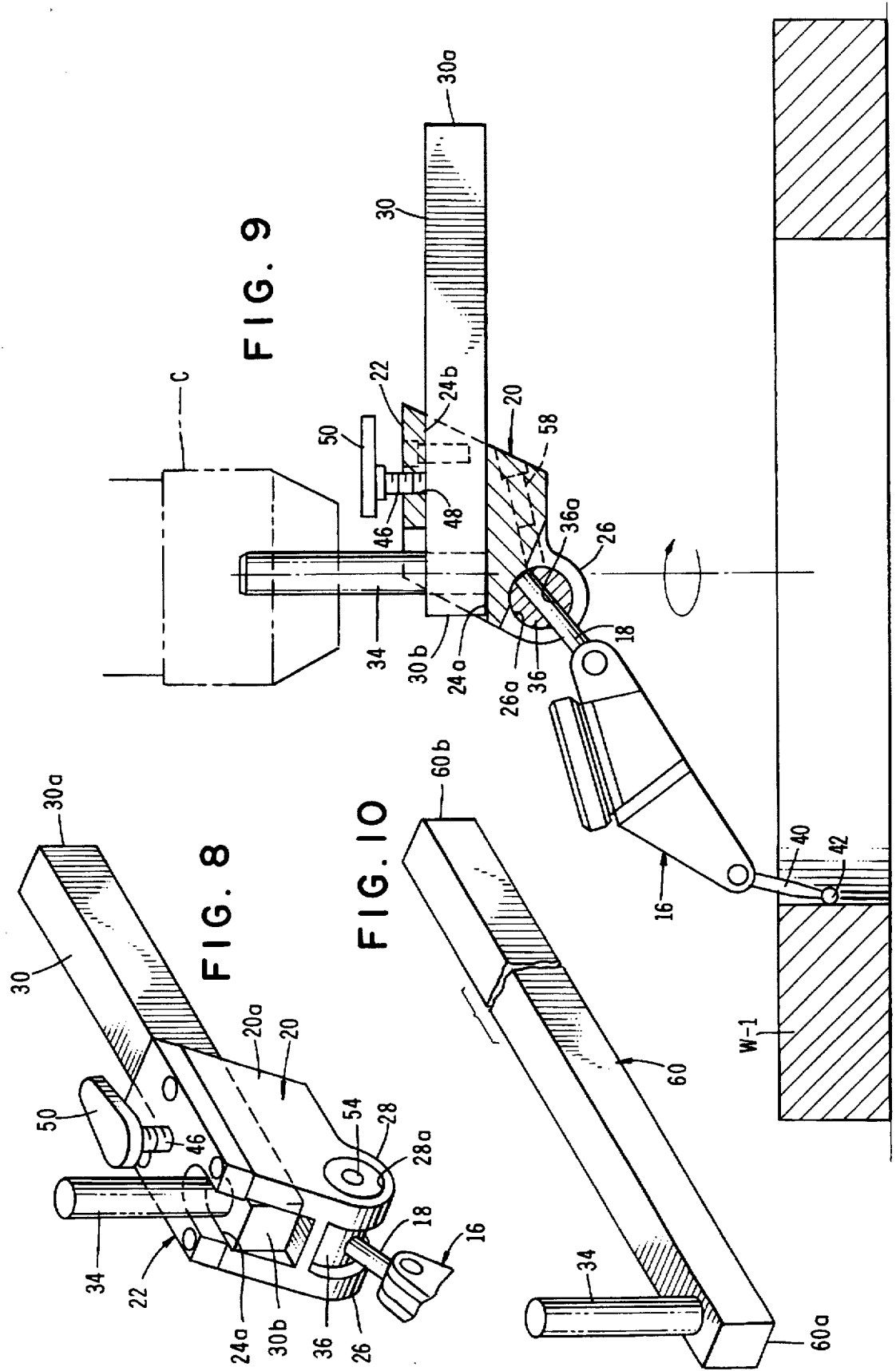

INDICATOR HOLDER WITH SLIDABLE CONNECTING MEMBER

BACKGROUND OF THE INVENTION

1. Field of the Invention

The present invention relates generally to measuring devices. More particularly, the invention concerns a novel indicator holder for use in connection with a dial test indicator assembly and with machine tools such as jigbore machines, milling machines and the like.

2. Discussion of the Invention

A number of different types of dial test indicators are commercially available. These devices typically include a body that supports a dial indicator which is operably interconnected with a stylus or contact point that terminates in a work-piece engaging ball. Generally the contact point is pivotally movable relative to the body of the device so that various surfaces of the workpiece can be easily contacted during work-piece measurement and inspection operations.

Many types of dial test indicators also include holding bars which extend outwardly from the body of the indicator so that the device can be interconnected with machine tools of various types such as milling machines, jigbore machines, lathes and the like. Exemplary of such dial test indicators are those sold by the Interapid Company of Switzerland and by United States companies such as Starrett and Rutland Tool and Supply. Certain of these companies, such as Rutland Tool and Supply also sell indicator holders for use in interconnecting dial test indicators with machine tools such as milling machines, jigbores and the like. Many of the prior art indicator holders mount directly on the machine quill of the machine tool thereby bypassing the working tool. Other prior art indicator holders are provided with outwardly extending shanks than can be connected to the machine tool chuck or other working tool holding means. Exemplary of this last type of indicator holder is one sold by Brown & Sharpe Company under Order No. ZIT-5011L.

While the prior art indicator holders provide for placement of the test indicator in a number of positions relative to the workpiece, many are of complex construction, are often difficult to use and typically are quite expensive.

The primary thrust of the present invention is to provide a novel indicator holder which overcomes most of the drawbacks of the prior art indicator holders while at the same time providing a device of simple, yet elegant construction, that permits the test indicator to be located at a multitude of positions relative to the workpiece being indicated. As will be better understood from the description which follows, the indicator holder of the present invention is highly versatile, embodies a minimum number of component parts and is quickly adjustable to permit forward, backward and sideways movement of the test indicator relative to the workpiece. In adjusting the device it is not necessary to tighten and loosen large numbers of set screws nor is it necessary to perform cumbersome manipulations of multiple, cooperating connecting arms and swivels.

SUMMARY OF THE INVENTION

It is an object of the present invention to provide an indicator holder for use in connection with a dial test indicator and with machine tools such as jigbore machines, milling machines and the like which is of simple construction, but yet is extremely versatile in use and enables positioning of the dial test indicator in a multitude of orientations relative to the workpiece being measured.

Another object of the invention is to provide an indicator holder of the aforementioned character which readily permits forward, backward and transverse movement of the dial test indicator relative to the workpiece.

Another object of the invention is to provide an indicator element as described in the preceding paragraph in which distance between the dial test indicator stylus and the axis of rotation of the machine tool spindle can be precisely varied over a wide range of distances.

Another object of the invention is to provide an indicator holder of the class described which, due to the ease of adjustment of the indicator element in a forward, backward and transverse direction relative to the workpiece is particularly useful in indicating small holes in the workpiece.

Another object of the invention is to provide an indicator holder which embodies a minimum number of moving parts, is compact, easy to use and inexpensive to manufacture.

BRIEF DESCRIPTION OF THE DRAWINGS

FIG. 1 is a generally perspective view of one form of the indicator holder of the invention showing a dial test indicator of conventional design interconnected therewith.

FIG. 2 is an enlarged, side-elevational view partly in section of the indicator holder mounted in the tool holder of a machine tool and being used to indicate a small hole in a workpiece.

FIG. 3 is a cross-sectional view taken along lines 3—3 of FIG. 2.

FIG. 4 is a cross-sectional view similar to FIG. 3, but illustrating transverse movement of the indicator relative to the support housing of the device.

FIG. 5 is a generally perspective view of the indicator holder of the invention showing the slide arm of the device mated with the housing in a different orientation from that shown in FIG. 1 so as to increase the working radius of the device.

FIG. 6 is an enlarged, side-elevational view of the device shown in FIG. 5 connected to a machine tool and being used to measure the outer surface of a ring-shaped workpiece.

FIG. 7 is a cross-sectional view taken along lines 7—7 of FIG. 6.

FIG. 8 is a generally perspective view similar to FIG. 1, but showing the indicator slide arm retracted relative to the housing.

FIG. 9 is a side-elevational view similar to FIG. 2, but illustrating the device being used to locate the inner surface of a ring-shaped workpiece.

FIG. 10 is a generally perspective view of one form of an elongated slide arm of the indicator holder of the invention.

DESCRIPTION OF THE INVENTION

Referring to the drawings and particularly to FIGS. 1 through 3, one form of the indicator holder of the present invention is there illustrated and generally designated by the numeral 14. Indicator holder 14 is adapted for use in connection with a dial test indicator 16 of the character shown in FIG. 1 having an outwardly extending holding bar 18.

In the present form of the invention, the indicator holder includes a housing 20 to which a top plate 22 is interconnected. Top plate 22, along with the sidewalls 20a of housing 20, define a guideway 24 having first and second ends 24a and 24b respectively (see also FIG. 2). Housing 20 also includes first and second spaced apart, downwardly extending leg portions 26 and 28, each of which is provided with a generally circular shaped bore 26a and 28a respectively (FIG. 3). The purpose of bores 26a and 28a will presently be described.

Forming an important aspect of the indicator holder of the present invention is slide means for adjustably connecting housing 20 to the machine tool being used. In the present form of the invention, this important slide means comprises an elongated, bar-like slide member 30 which is slidably received within guideway 24 of housing 20. Slide member 30 has first and second ends 30a and 30b and is slidable from the extended position shown in FIG. 1 to the retracted position shown in FIG. 8.

A connecting rod 34 is connected to slide member 30 proximate the second end 30b thereof. Connecting rod 34 is adapted for interconnection with the holding bar gripping means of the machine tool being used as, for example, the chuck "C" shown in FIG. 2. Bar 34 may be of various diameters and may be interconnected with a number of different types of holding bar gripping means on several types of machine tools such as jigbore machines, milling machines and the like. Due to the versatility of the indicator holding means of the invention, the indicator holder is particularly useful in connection with Computer Numerical Control (C.N.C.) machines.

To interconnect the dial test indicator 16 with housing 20, connector means are provided. These novel connector means, which here include a generally cylindrically shaped support member 36, permit both pivotal and transverse movement of the dial test indicator 16 relative to housing 20. As best seen by referring to FIG. 3, the end portions of support member 36 are both rotatably and slidably receivable within apertures 26a and 28a provided in portions 26 and 28 of housing 20. More particularly, as shown in FIGS. 2 and 9, member 36 is rotatable relative to housing 20 from the position shown in FIG. 2 to the position shown in FIG. 9 so that the angle between the axis of member 18 and the axis of holding bar 34 can be precisely varied. Similarly, as shown in FIGS. 2 and 4, cylindrically shaped support member 36 is slidably movable from the position shown in FIG. 3 to the position shown in FIG. 4 thereby permitting sidewards movement of the dial test indicator assembly relative to housing 20. While member 36 is shown in FIG. 4 as being moved to the left, it is to be understood that the support member can also be moved to the right as viewed in FIG. 4 so that the stylus 40 and contact point 42 of the dial test indicator assembly can be precisely moved for purposes of locating a hole such as hole "H" provided in workpiece "W" (FIG. 2). By way of example, in using the apparatus of the invention to indicate a hole of, for example, 0.100 inch in diameter with a stylus contact point of 0.080 diameter, the indicator holder is first adjusted so that the contact point 42 is running true. This can be readily accomplished using the indicator holder of the present invention by sliding slide bar 30 either forwardly or backwardly as may be required. Sideways movement of contact point 42 can be precisely achieved by sliding cylindrical member 36 to the right or to the left as viewed in FIG. 4. In this regard, member 36 is closely received within bores 26a and 28a formed in housing 20 so that a substantial degree of sliding friction resists movement of member 36 transversely of housing 20.

As best seen by referring to FIG. 2, locking means are provided for locking slide member 30 within guideway 24. This locking means here comprises a set screw 46 which is threadably received within a threaded bore 48 provided in top member 22 of housing 20. A finger engaging member 50 is affixed to the upper portion of threaded member 46 to facilitate tightening and loosening of threaded member 46 relative to slide bar 30. Locking means are also provided for locking holding bar 18 of the dial test indicator within a holding bar receiving bore 36a provided in member 36. This locking means here comprises a threaded set screw 54 which is threadably received within a threaded axial bore 36b provided in cylindrical member 36. Set screw 54 includes an inner extremity 54a which engages holding bar 18 in the manner shown in FIG. 3. A third locking means shown here as a threaded set screw 58 either locks cylindrical member 36 against rotation within bores 26a and 28a of housing 20 or, alternatively, functions to impede rotation thereof, as well as transverse sliding movement thereof, within bores 26a and 28a. Set screw 58 is threadably received within the threaded bore 60 provided in housing 20 and has an inner end portion 58a which engages member 36 in the manner best seen in FIG. 2.

An extremely important feature of the apparatus of the present invention resides in the fact that first end 30a of slide bar 20 can be received either within open end 24a of guideway 24 as shown in FIG. 1 or, alternatively, in the second end 24b of the guideway as shown in FIG. 5. With this novel construction, the effective radius that can be swept by stylus 40 can vary from the small radius shown in FIG. 8 to the much larger radius shown in FIG. 6. Stated another way, when slide bar 30 is connected to housing 20 by inserting end 30a within end 24a of guideway 24 and by sliding member 30 fully to the right as viewed in FIG. 8, holding bar 18 is disposed in close proximity with connecting rod 34. However, when end 30a of slide bar 30 is inserted into end 24b of guideway 24 in the manner shown in FIG. 6, holding bar 18 is spaced a considerable distance from connecting rod 34. The radius of sweep can be further increased by pivoting bar 18 upwardly in the manner shown in FIG. 6 to a position wherein the dial indicator assembly is in a generally horizontal position. In this position, by pivoting stylus 40 downwardly, the device can be used to indicate the outer surface of a relatively large diameter workpiece "W-1". Conversely, when end 30a of bar 30 is inserted into end 24a of guideway 24 in the manner shown in FIG. 9 and the slide bar 30 moved fully to the right, the apparatus can conveniently be used to indicate the inner surface of the ring-shaped workpiece "W-1" in the manner shown in FIG. 9.

When even a greater radius of sweep is desired than can be achieved with such as slide bar 30, a longer slide bar 60 such as that shown in FIG. 10 can be provided. Slide bar 60 has end portions 60a and 60b and, as in the previous embodiment of the invention, end 60b can be inserted either into end 24a or guideway 24 or into end 24b of the guideway. Use of slide bar 60 provides even greater versatility to the apparatus and makes it extremely useful when dealing with relative large workpieces such as ring-shaped workpiece "W-1".

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An indicator holder for use in connection with a dial test indicator and with machine tools having holding bar gripping means, said indicator holder comprising:

(a) a housing having a guideway provided with first and second open ends;

(b) slide means for adjustably connecting said housing to the machine tool, said slide means comprising:
  (i) a slide member slidably movable within said guideway of said housing, said slide member having first and second ends; and
  (ii) a connecting rod connected to said slide member proximate said second end thereof, said connecting rod being adapted for interconnection with the holding bar gripping means of the machine tool; and
  (iii) connector means for interconnecting said dial test indicator with said housing for both pivotal and transverse movement of said dial test indicator relative to said housing.

2. An indicator holder as defined in claim 1 in which said dial test indicator includes an outwardly extending holding bar and in which said connector means comprises:
  (a) a support member rotatably connected to said housing, said support member having a holding bar receiving bore; and
  (b) locking means for locking the holding bar of the dial test indicator within said holding bar receiving bore of said support member.

3. An indicator holder as defined in claim 2 in which said housing further includes first and second spaced-apart leg portions each having a bore therethrough and in which said support member of said connector means includes first and second, generally cylindrically shaped end portions, closely receivable within said bores of said first and second leg portions respectively for both rotational and transverse movement with respect thereto.

4. An indicator holder as defined in claim 2 in which said housing further includes means for locking said slide member within said guideway.

5. An indicator holder as defined in claim 2 in which said first end of said slide member is received within said first end of said guideway.

6. An indicator holder as defined in claim 2 in which said first end of said slide member is received within said second end of said guideway.

7. An indicator holder for use in connection with a dial test indicator having an outwardly extending holding bar and with machine tools having holding bar gripping means, said indicator holder comprising:
  (a) a housing having a guideway provided with first and second open ends;
  (b) slide means for adjustably connecting said housing to the machine tool, said slide means comprising:
    (i) a slide member slidably movable within said guideway of said housing, said slide member having first and second ends; and
    (ii) a connecting rod connected to said slide member proximate said second end thereof, said connecting rod being adapted for interconnection with the holding bar gripping means of the machine tool; and
    (iii) connector means for interconnecting said dial test indicator with said housing for both pivotal and transverse movement of said dial test indicator relative to said housing, said connector means comprising:
      a. a generally cylindrically shaped support member rotatably connected to said housing, said support member having a holding bar receiving bore; and
      b. locking means for locking the holding bar of the dial test indicator within said holding bar receiving bore of said support member.

8. An indicator holder as defined in claim 7 in which said housing further includes first and second spaced-apart leg portions each having a generally circular shaped bore therethrough and in which said support member of said connector means is closely receivable within the bores of said first and second leg portions respectively for both rotational and transverse movement with respect thereto.

9. An indicator holder as defined in claim 7 in which said housing further includes means for locking said slide member within said guideway.

10. An indicator holder as defined in claim 7 in which said first end of said slide member is received within said first end of said guideway.

11. An indicator holder as defined in claim 7 in which said first end of said slide member is received within said second end of said guideway.

12. An indicator holder for use in connection with a dial test indicator having an outwardly extending holding bar and with machine tools having holding bar gripping means, said indicator holder comprising:
  (a) a housing having a guideway provided with first and second open ends and including first and second spaced apart leg portions each having a generally circular shaped bore therethrough;
  (b) slide means for adjustably connecting said housing to the machine tool, said slide means comprising:
    (i) an elongated bar like slide member slidably movable within said guideway of said housing, said slide member having first and second ends; and
    (ii) a connecting rod connected to said slide member proximate said second end thereof, said connecting rod being adapted for interconnection with the holding bar gripping means of the machine tool; and
    (iii) connector means for interconnecting said dial test indicator with said housing for both pivotal and transverse movement of said dial test indicator relative to said housing, said connector means comprising:
      a. a generally cylindrically shaped support member rotatably connected to said housing, said support member having a holding bar receiving bore and being closely received within the bores of said first and second leg portions respectively for both rotational and transverse movement with respect thereto; and
      b. locking means for locking the holding bar of the dial test indicator within said holding bar receiving bore of said support member, said locking means comprising a set screw threadably connected to said support member.

13. An indicator holder as defined in claim 12 in which said housing further includes means for locking said slide member within said guideway.

14. An indicator holder as defined in claim 12 in which said first end of said slide member is received within said first end of said guideway.

15. An indicator holder as defined in claim 12 in which said first end of said slide member is received within said second end of said guideway.

16. An indicator holder as defined in claim 12 further including means for locking said support member against rotation relative to said first and second leg portions of said housing.

* * * * *